United States Patent

[11] 3,540,607

| [72] | Inventor | Richard M. Mandel |
| | | 604 Skokie Lane S., Glencoe, Illinois 60022 |
| [21] | Appl. No. | 750,155 |
| [22] | Filed | Aug. 5, 1968 |
| [45] | Patented | Nov. 17, 1970 |

[54] CONVEYANCE WITH AN EXTENDABLE PLATFORM
8 Claims, 8 Drawing Figs.

[52] U.S. Cl........................................................ 214/85, 108/74; 296/26
[51] Int. Cl........................................................ B60p 1/44
[50] Field of Search............................................ 214/85, 512, 75H; 296/24, 26; 108/69—76

[56] References Cited
UNITED STATES PATENTS

| 1,349,471 | 8/1920 | Noennig........................ | 108/74 |
| 1,756,586 | 4/1930 | Drew............................. | 108/73 |
| 1,910,398 | 5/1933 | Ludington..................... | 214/85UX |
| 2,370,427 | 2/1945 | Sherry........................... | 214/85 |

Primary Examiner—Albert J. Makay
Attorney—Hofgren, Wegner, Allen, Stellman and McCord ABSTRACT: A mechanism is provided for extending and retracting a platform for a conveyance. The platform is either retracted under the floor boards of the conveyance or is extended and is raised to the level of the floor boards by a novel power actuator, rack and gear means, and toggle link and cam arrangement. The operative parts of the mechanism can be disconnected easily from the conveyance and from the platform and removed therefrom for service and repair.

Patented Nov. 17, 1970
3,540,607
Sheet 1 of 4
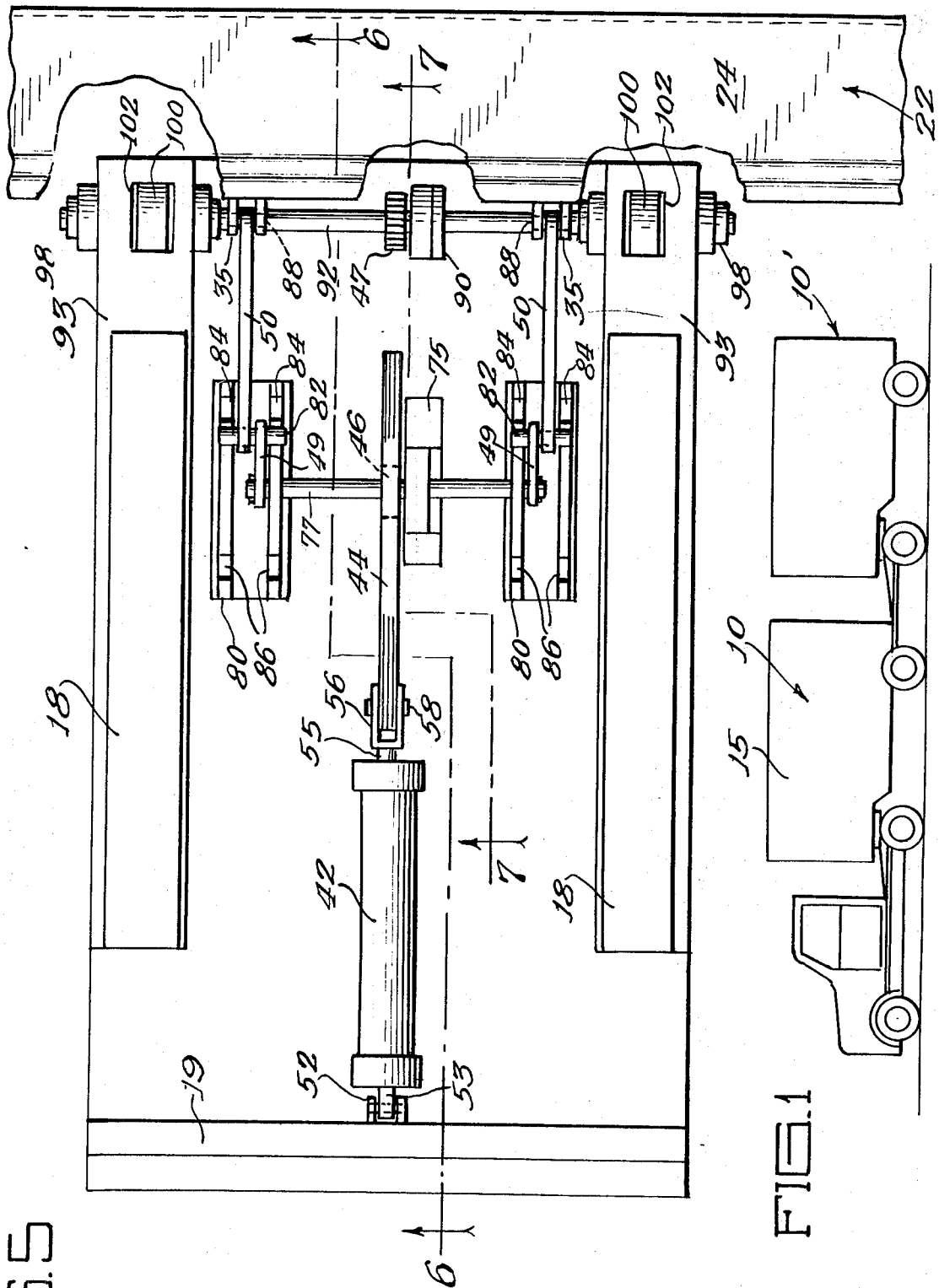
Inventor:
Richard M. Mandel
By: Hofgren, Wegner, Allen,
Stellman & McCord
Attorneys

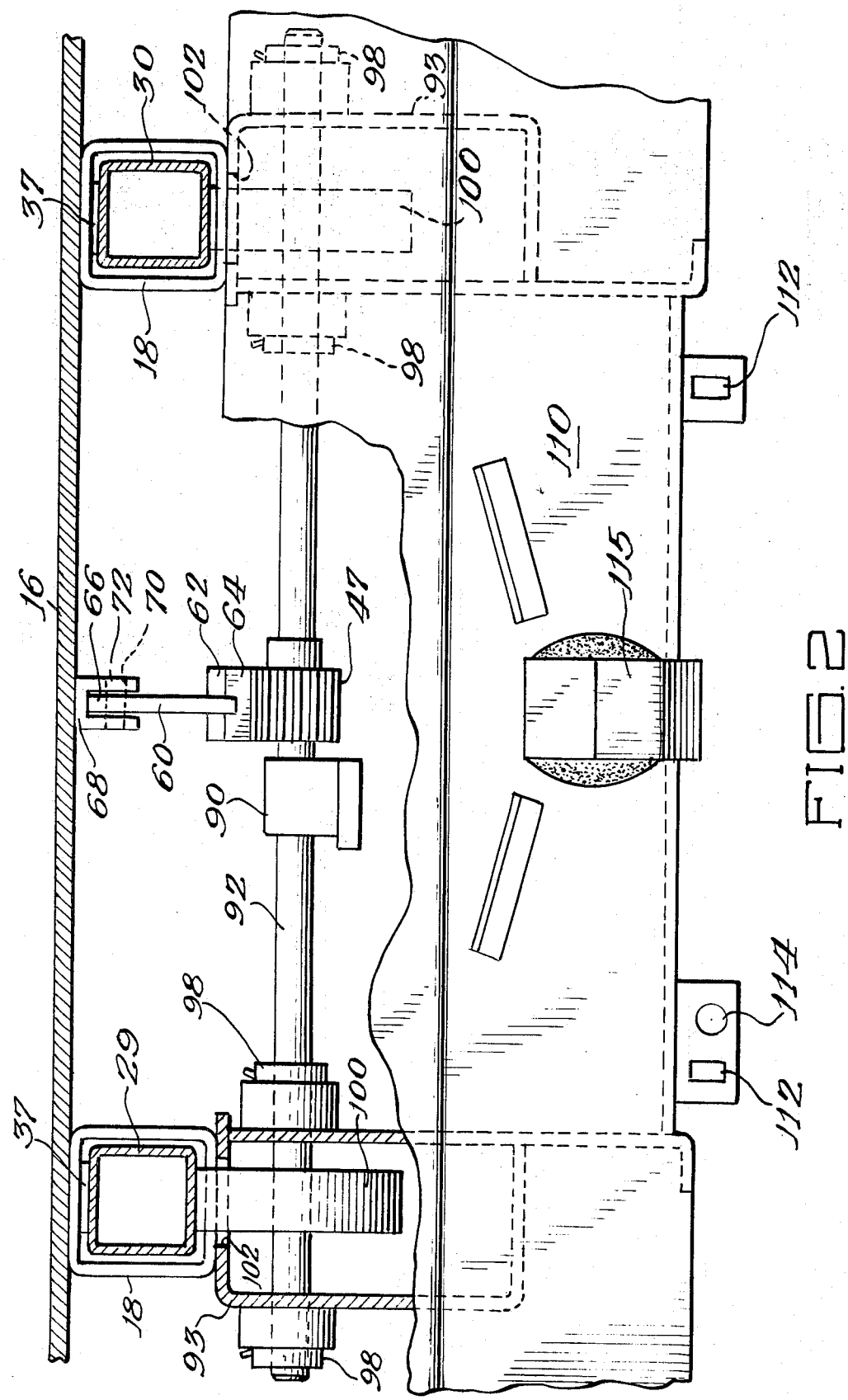

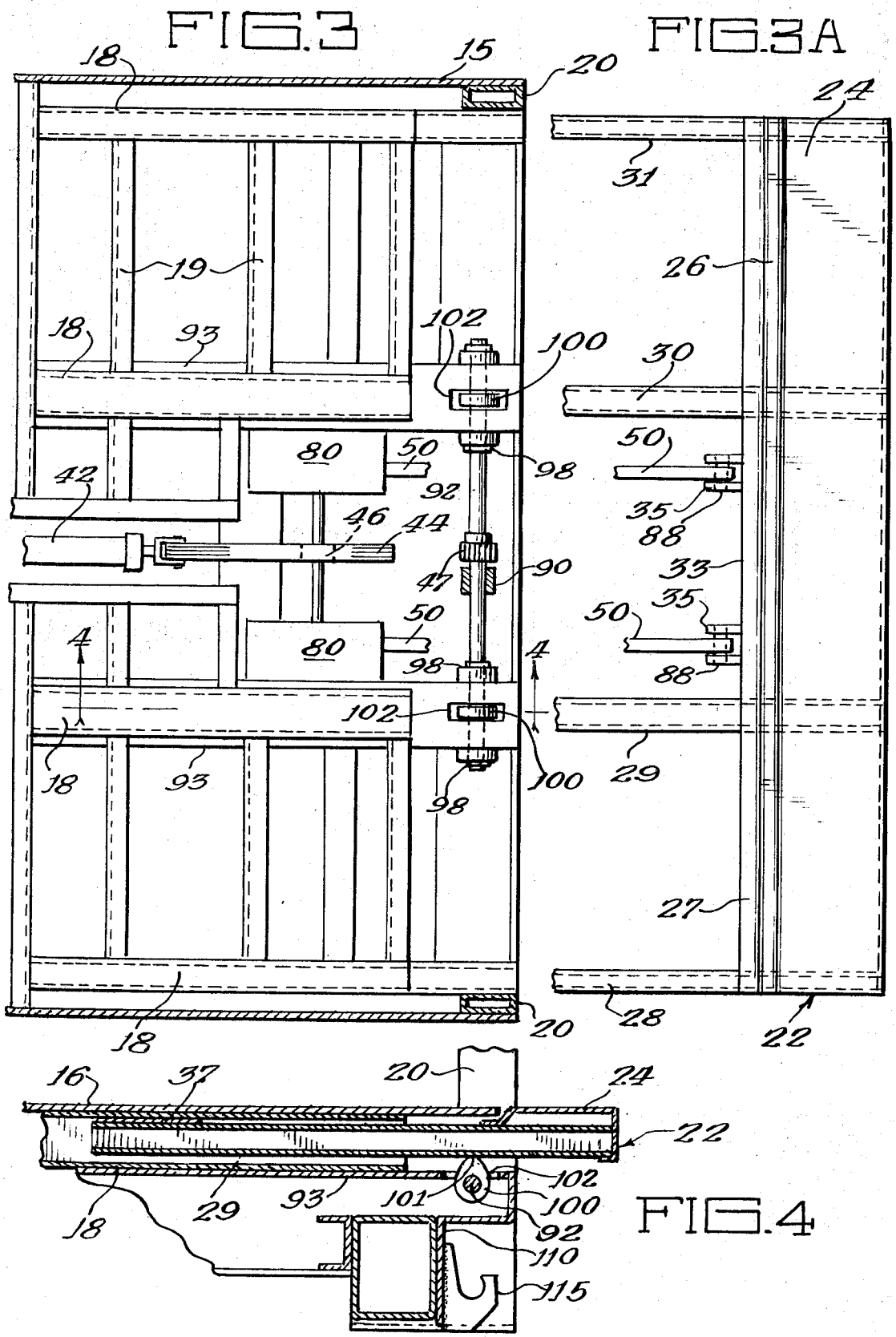

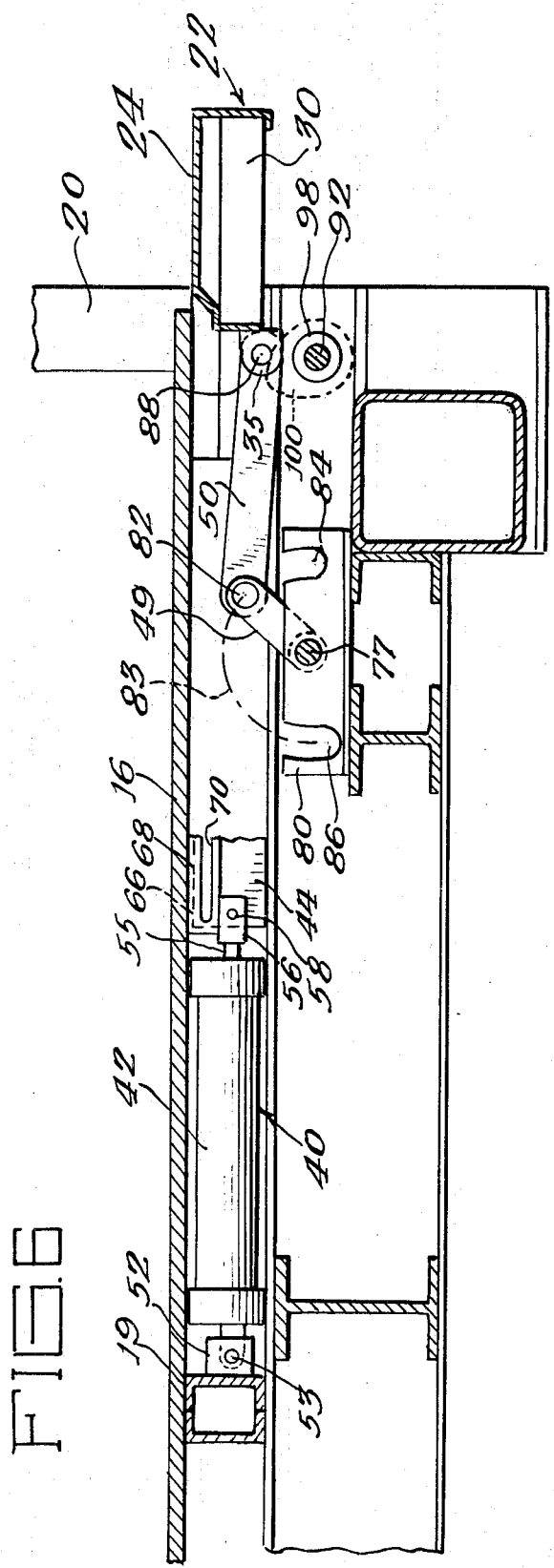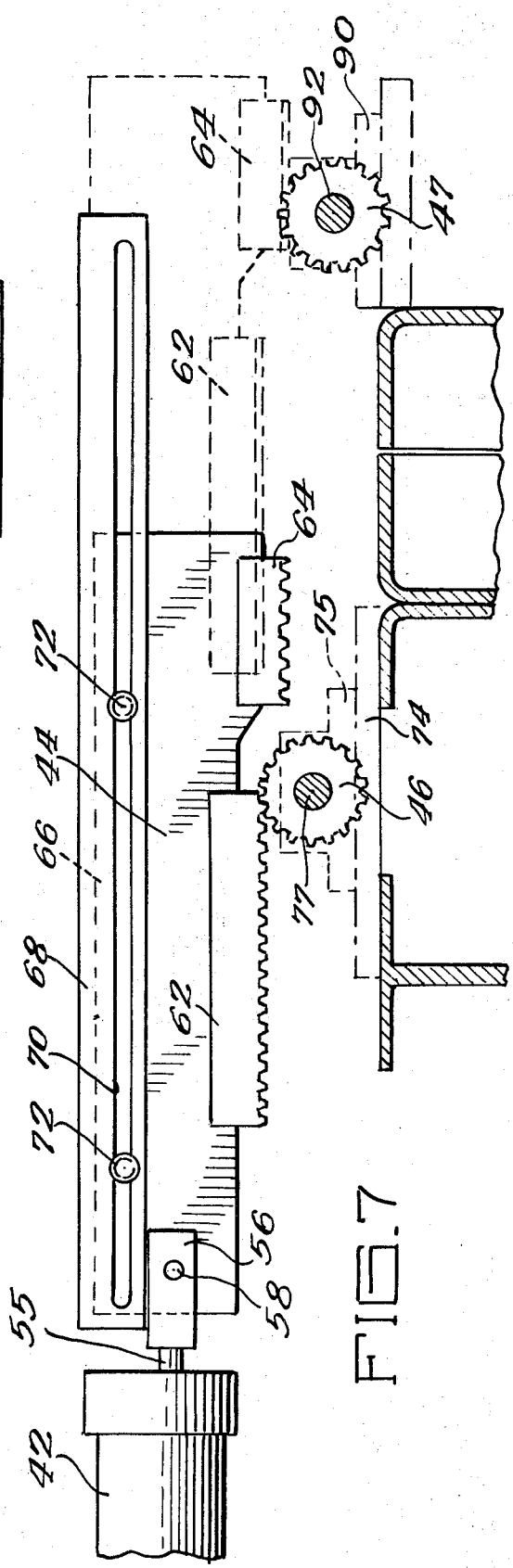

3,540,607

CONVEYANCE WITH AN EXTENDABLE PLATFORM

BACKGROUND OF THE INVENTION

1. Field of the Invention

This invention relates generally to platforms for conveyances and, more particularly, to mechanisms for retracting and extending platforms on over-the-road vehicles.

2. Discussion of the Prior Art

Many trucks used in making local deliveries have platforms in the rear which act as elevators to move merchandise or men between the vehicle and the ground. Other trucks have pivoted tail gates which can be dropped or raised to act as a platform for loading and unloading the contents of the truck. The elevators or the pivoted tail gates are satisfactory for vehicles used solely in town, but heavy equipment, such as trailers that are primarily long haul, over-the-road vehicles, cannot conveniently have elevators or tail gates without creating interference and damage to the equipment. That is, when two or more trailers are connected together in tandem, the connection between the trailers is such that the front corners of one trailer will come very close to the body of the trailer in front of it on certain types of turns. Any current projecting platforms or elevators would be crushed or damaged if they were on the lead trailer ahead of another trailer in the tandem hookup. Truckers prefer to have a vehicle that is usable not only for long hauls which have few uses for a platform extension, but also for in town delivery which requires a platform extension of some sort.

In an attempt to solve this problem, U.S. Pat. No. 2,850,187 was issued to E.Y. Roberts who showed a tailgate mechanism which acted as an elevator, as a platform and as a tailgate. However, the tailgate was still exposed rearward of the truck and would interfere with other trailers in a tandem hookup.

U.S. Pat. No. 3,245,714 to Blair relates to a mechanism for telescoping a support for a truck body out from the sides of the truck. This would not provide a loading platform from a conventional truck and, in fact, it would not be usable on most trucks made today.

The U.S. Pat. No. 3,239,274 to Weiss provides a mechanism for extending a whole truck body including the rear wheel assembly relative to the front wheels of the truck. This is quite complicated, weakens the truck body members and is not a platform for use in loading and unloading the truck.

The patents to Uttley U.S. Pat. No. 3,116,085 and Nash U.S. Pat. No. 2,899,237 show telescopic body parts of a truck for use in unloading a truck.

SUMMARY OF THE INVENTION

A mechanism is provided for retracting and extending a platform from beneath the rear deck of a truck. The mechanism includes a power-operated cylinder driving in a linear direction a double rack. Each of the double racks successively engages and drives one of a pair of spaced pinions. The first pinion drives a link mechanism for urging the platform forward. Once the platform reaches its extended position the second pinion is driven which operates a lifting mechanism for raising the platform to a height to conform substantially to the level of the floor of the truck. The same steps in reverse are used to retract the platform underneath the rear deck of the truck. The link mechanism is such as to provide a toggle locking action for holding the platform extended or retracted.

Having thus described the invention in general terms, reference will now be made to a detailed embodiment of the invention which is shown in the accompanying drawings wherein:

FIG. 1 is a schematic view of a double tandem over-the-road tractor trailer with a retractable platform assembly embodying the invention;

FIG. 2 is an enlarged partial rear view of the lead trailer of FIG. 1 with parts broken away;

FIG. 3 is a top plan view of the operating elements of the retractable platform with the floor boards or deck removed therefrom;

FIG. 3A is the platform and actuating arms for the platform exploded from FIG. 3 but with the operative parts aligned with their coacting members of FIG. 3;

FIG 4 is a cross-sectional view taken on the line 4-4 of FIG. 3;

FIG. 5 is an enlarged top view of the operative parts of the structure of FIG. 3 showing more details of the mechanism;

FIG. 6 is a cross-sectional view taken on the line 6-6 of FIG. 5; and

FIG. 7 is an enlarged cross-sectional view taken on the line 7-7 of FIG. 5.

Referring to the drawings wherein like reference numerals refer to like parts throughout the several views, a load carrying conveyance such as a truck or trailer 10 can make use of a platform which extends rearward of the back of the truck or trailer particularly during loading and unloading of the conveyance, as well as to protect the trailer body from damage by repetitive spotting of the trailer against loading docks. During the time when the conveyance is moving from one destination to another, there is generally no need for the platform and, in fact, there are occasions when the protrusion of the platform creates complex problems. For instance, when a second trailer 10' is hooked in tandem to a first trailer 10, as in FIG. 1, the front corners of the second trailer 10' will be crushed against any platform extending more than a few inches beyond the rear corners of the front trailer 10 during turning around of the trailers or in navigating a sharp bend in the road. This invention overcomes the problem of crushing of the rear trailer and prevents damage to the platform on the front trailer.

The box or body 15 of a trailer 10 has a deck or floor 16 secured on beams or structural members 18, 19 extending lengthwise and crosswise, respectively, beneath said deck. Posts 20 extend upwardly from the side edges of the beams 18 for supporting the walls and roof of the trailer. Beneath the rear portion of the deck and extending inward an appropriate distance is formed a recess into which a retractable platform 22 can nest. The retractable platform 22, as shown in FIG. 3A, extends substantially the width of the trailer and has a top surface 24 adapted to be substantially aligned with the deck 16 of the body when in the extended and raised position. The top surface 24 has a downwardly and forwardly directed lip 26 which forms the undercut front edge 27 of the platform.

Beneath the platform 22 and forwardly extending therefrom are four support beams 28, 29, 30 and 31 which are secured to the underside of the platform at spaced apart points thereacross. Crossbars 33 extended between at least the two middle beams 29 and 30 to which is attached forwardly opening brackets 35. The platform beams 28, 29, 30 and 31 align with and are slidably and telescopically received in the structural beam members 18 beneath the deck 16 of the body 15. The platform beam 28, and similarly beams 29, 30 and 31, has a stabilizing wear plate 37 fastened on the top surface thereof near the inner end of said beam. The plate 37 slides with the beam along the inner surface of the top wall of the beam 18.

The platform 22 is extended and retracted by means of an appropriate actuator mechanism 40 which in the illustrated form broadly includes an air or hydraulic cylinder 42, a rack member 44, pinions 46, 47, and toggle links 49 and 50 connected to the platform 22. Specifically, the air or hydraulic cylinder 42 has its cap end removably and pivotally connected to a bracket 52 on one of the frame members 19 of the body 15 by means of a pin 53. Most trucks and over-the-road vehicles have air or hydraulic systems as part of their standard equipment so no extra expense in installing such a source of power is required in applying the retractable platform to the truck. The piston rod 55 of the cylinder 42 has affixed thereto a U-shaped bracket 56 connected by a pin 58 to the movable rack member 44.

The rack member 44 has an elongate body member 60 with two longitudinally spaced apart rack segments 62 and 64 welded to the lower edge portion thereof. The rack segments 62 and 64 are at different levels vertically and are spaced apart longitudinally in such a way that the rack segment 62 will be engaged with pinion 46 when rack segment 64 is not engaged with pinion 47 and vice versa. The top portion 66 of the body member 60 slides in an inverted U-shaped track 68 welded or otherwise secured to the truck or vehicle frame underneath the floor of the vehicle as shown in FIGS. 2 and 7. The track 68 has a pair of aligned straight slots 70, one in each side wall. In the slots 70 slide a pair of longitudinally spaced, sidewardly projecting pins or bearing mounted wheels 72. The pins 72 and walls of the slots 70 constrain the rack member 44 to straight line reciprocative motion relative to the cylinder 42. The pins 72 can be removed from the slots 70 of the track 68 so as to drop the rack 44 with rack segments 62, 64 from the truck body for inspection or repair.

Mounted on the truck frame is a plate 74 for supporting a pillow block 75 through which extends a shaft 77 having the pinion 46 keyed thereto in position to be selectively engaged by the rack segment 62. The opposite ends of the shaft 77 extend into bearing supports in the walls of a pair of boxes 80 secured to two spaced apart frame members 18 as by welding or the like. A link 49 is keyed to each end of said shaft 77 and lies within the appropriate box 80. An elongate pin 82 passes through the outer end of each link 49 such that the ends of each pin 82 will nest in one of the arcuate slots 84, 86 formed in the side walls of each box 80. A link 50 is positioned in each box 80 and has one end portion journaled to the pin 82 and has the other end portion journaled by a pin 88 to the bracket 35 on the platform 22.

The rack segment 62 is just long enough in a longitudinal direction to turn the pinion 46, shaft 77 and links 49 from a position with the pins 82 in the bottom of the arcuate slots 86 to a position with the pins 82 in the bottom of the other arcuate slots 84. The just referred to movement of the pins 82 will move the link 50 and platform 22 from a completely retracted position with the deck 24 of the platform beneath the floor of the vehicle to a fully extended position with the undercut edge portion 26 partially beneath the rear edge of the floor or deck 16. The slot 86 is below the plane of the axis of the shaft 77 so as to create a toggle action between the links 49 and 50 as will be described hereinafter.

As shown in FIG. 6, the throw of the link 49 comprises the extent of the movement of the platform 22 from its extended to its retracted position. The dashed arcuate lines 83 are phantom representations of the path the pins 82 will travel. In fact, the only arcuate segments formed in the walls of the boxes 80 are the portions 84 and 86. In FIG. 7, the dashed lines to the right of the view illustrate in phantom the extreme right-hand position the rack member 44 will assume when the piston 55 is fully extended and the platform 22 is extended and in raised position.

A mechanism is provided for raising and lowering the platform 22 when in its extended position so as to substantially align the deck 24 of the platform with the deck 16 or floor of the vehicle. Specifically, a pillow block 90 rotatably supports a shaft 92 to which is keyed the pinion 47 which is in alignment with the rack segment 64 of the reciprocating rack member 44. The rack segment 64 on the rack member 44 engages with and rotates the pinion 47 and shaft 92 during a portion of the reciprocation of said rack member 44. The shaft 92, as seen in FIGS. 2 and 5, has its end portions journaled in two structural beams 93 which are part of the vehicle frame and to the top of which are fastened two of the lengthwise extending beams 18. The end portions of the shaft 92 are keyed against axial shifting by means of washers and cotter keys 98 or the like which engage on opposite sides of the beams 18.

Cam rollers 100 are keyed to the shaft 92 and are located between the walls of the beams 93 and have their working surfaces 101 projecting through openings 102 in the top walls of said beams 93 so that said cam surfaces of the rollers 100 can engage with the undersurface of the beams 29, 30 of the platform 22. When the rack member 44 moves the rack segment 64 into engagement with the pinion 47, the platform 22 is completely extended and the movement of the pinion 47 by the rack 64 rotates the shaft 92 and cam 100 so that the raised portion of the cam surface 101 of the cam engages the undersurface of beams 29, 30 and raises the platform the extent of the cam throw.

As viewed in FIG. 4, the cam 100 raises the platform 22 by pivoting the beams 28, 29, 30 and 31 about the forward contact point of the wear plate 37 against the inner top wall of the beams 18. To lower the platform 22 from the raised position, the cylinder 42 is actuated whereupon the rack member 44 draws the rack segment 64 over the pinion 47 to rotate the cam 100 thereby lowering the platform the extent of the cam throw. Further retraction of the rack member 44 disengages rack segment 64 from pinion 47 and engages the rack segment 62 with the pinion 46 for pivoting the links 49 and 50 to retract the platform into nested position beneath the tail end portion of the vehicle body deck 16. As the pins 82 between the links 49 and 50 reach the rear end of the swing, they are pulled down into slots 86 below the horizontal plane of the shaft 77 to give an overcenter or toggle locking action effect. The action is a snap action as the pins 82 go below the horizontal plane passing through the axis of shaft 77 which action serves to lock or latch the platform in the retracted position preventing accidental extension of the platform caused by vibrations of the vehicle. The first result of movement of the rack segment 62 and gear 46 to extend the platform is to rotate the shaft 77 and links 49 to lift the pins 82 out of the bottom of the slots 86 which action does not move the platform rearward. Once the pins 82 move above the plane of the shaft 77, the platform begins to be moved rearward as discussed above. The same overcenter or toggle action effect is created at the extended position of the platform when the pins 82 go below the plane passing through the shaft 77 and the pins 88 and snap into the bottom of the arcuate slots 84. The toggle action assists in preventing the platform from accidentally retracting.

The vehicle 10 has a downwardly directed rear plate 110 which supports the air line connections 112 and electrical connections 114 for passing air, fluid or electricity to a tandem connected trailer. A trailer hitch 115 is mounted on the frame underneath the rear extent of the vehicle body 10 and platform 22 even when the platform is fully retracted.

The operating mechanism for the platform 22 is easily removed from the vehicle for service and repair. The cylinder 42 can be disconnected and removed by removing pins 53 and 58. The rack member 44 and associated rack segments 62 and 64 can be removed by removing pins 72 from the track 68. The platform 22 can be removed by removing pins 88 from the brackets 35 and sliding the beams 28, 29, 30 and 31 out of the beams 18. And the pinions 46, 47, shafts 77, 92 and associated links and cams can be removed by removing the cotter pins and/or pillow block retaining caps.

With the platform 22 retracted there are no protruding elements that can be bumped to cause damage to the platform mechanism or to following conveyances. With the platform extended a stable and steady support is provided for loading and unloading the conveyance.

Motor freight companies may be expected to equip their fleets of truck-trailers with trailer units, each of which has the retractable platform at the rear. While in intercity transit, the platforms on both trailers would be in retracted position whether one or more trailers were being so transported. At the city terminal, the trailers would be disconnected respectively from the tractor and from the converter dolly for the rearward trailer and each so disconnected trailer would be hooked-up to a tractor for in-town deliveries. When each over-the-road trailer has the retractable platform, each trailer is capable of having its platform extended for use during in-city deliveries. The trailer will not be damaged as the platform will absorb any abuse coincident with ramming into loading docks, etc.

It is contemplated that the present extensible platform will find its most frequent use in shorter trailer bodies of 20 to 27 feet in length rather than the larger vans of 40 feet and upwards. It may also be pulled by a truck having its own van body as well as by a tractor or on a converter dolly. Trailer frames having decks particularly made to receive containers becoming popular in containerized freight handling may also be equipped with the retractable platform of this invention, where the same would be of particular value in intercity transport of such containers followed by deliveries intracity from the containers. The invention is applicable to any other conveyance in which it may be beneficially used.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:

1. A platform extending mechanism for a vehicle having a deck, a platform nested beneath the rear portion of said deck, means for guiding the movement of said platform from a retracted position to an extended position, and means carried by said vehicle and operatively connected to said platform for extending and retracting said platform, said means comprising a power operated piston, a rack means reciprocated by said piston, a pinion engagable by said rack during the reciprocation of said piston, said pinion being operatively connected to a driving link, a driven link connected between said driving link and the platform whereby movement of the pinion and links in one direction advances the platform and movement in the reverse direction retracts the platform relative to the deck.

2. A platform extending mechanism as claimed in claim 1 in which means are provided for raising said platform when in the extended position so as to align the surface of the platform with the surface of the deck of the vehicle.

3. A platform extending mechanism as claimed in claim 2 wherein said last named means comprises a cam engaging said platform and being operatively connected to a second pinion, and a second portion of said rack means engaging said second pinion when said first named pinion is inoperative to thereby rotate said cam and raise said platform.

4. A platform extending mechanism as claimed in claim 1 wherein said driving and driven links have an overcenter position on both the extended and the retracted position of the platform for locking the platform in its extended or retracted position.

5. A platform extending mechanism for a vehicle having a deck, a platform nested beneath the rear portion of said deck, means for guiding the movement of said platform from a retracted position to an extended position, a power operated reciprocating means carried by said vehicle, a rack member reciprocated by said means, said rack member having a pair of rack segments axially spaced therealong, a first pinion engagable by one of said rack segments during a portion of the movement of said piston, a second pinion engagable by the other of said rack segments during a different portion of the movement of said piston, said first pinion being operatively connected to a driving link, a driven link connected between said driving link and the platform whereby movement of the first pinion and links in one direction advances the platform and movement in the reverse direction retracts the platform relative to the deck, said second pinion being operatively connected to means engaging said platform whereby when said platform is in the extended position movement of the second pinion and said means in one direction raises said platform and movement in the reverse direction lowers said platform relative to said deck.

6. A platform extending mechanism as claimed in claim 5 wherein said last named means is a cam which operatively engages the underside of said platform.

7. A platform extending mechanism as claimed in claim 5 wherein said means for guiding the movement of said platform comprises at least two hollow deck supporting beams extending rearwardly of the vehicle, at least two members carried by said platform nesting inside said hollow beams, and wear means carried by the top surface of said members engaging the inside top wall of the beams for slidably supporting said members relative to said beams.

8. A platform raising mechanism for a vehicle having a deck, a platform carried by said vehicle, means for moving said platform from a below deck, retracted position to an outer extended, deck level position, a straight-line motion power source for both extending and retracting as well as raising and lowering of such platform relative to the deck, connecting means between the power source and the platform providing such extending and retracting movement of the platform, a rack member movable with the power source motion, a pinion on the vehicle in position to be engaged by the rack member only during that portion of the power source motion near the extended position of the platform, and cam members carried on the vehicle operatively movable with said pinion to raise and lower the platform during the outer portion of platform movement.